United States Patent [19]

Esser et al.

[11] Patent Number: 4,626,654
[45] Date of Patent: Dec. 2, 1986

[54] METALLURGICAL PLASMA MELTING PROCESS

[75] Inventors: Fred Esser; Detlev Klöpper, both of Leipzig; Walter Lachner; Gerhard Scharf, both of Dresden, all of German Democratic Rep.

[73] Assignee: VEB Edelstahlwerk "8 Mai 1945" Freital, Freital, German Democratic Rep.

[21] Appl. No.: 427,376

[22] Filed: Sep. 29, 1982

Related U.S. Application Data

[62] Division of Ser. No. 231,606, Feb. 5, 1981, Pat. No. 4,390,773.

[51] Int. Cl.⁴ .............................................. B23K 15/00
[52] U.S. Cl. ...................... 219/121 PR; 219/121 PY; 219/121 PB; 373/18; 373/24
[58] Field of Search ................. 219/121 PY, 121 PA, 219/121 PB, 121 PR, 121 PM, 76.16, 75; 373/22, 24, 18; 204/164

[56] References Cited

U.S. PATENT DOCUMENTS

| | | | |
|---|---|---|---|
| 3,422,206 | 1/1969 | Baker et al. | 219/75 |
| 3,779,182 | 12/1973 | Camacho | 219/121 PA |
| 3,894,573 | 7/1975 | Paton et al. | 219/121 PR |
| 4,263,468 | 4/1981 | Primke et al. | 373/22 |

Primary Examiner—M. H. Paschall
Attorney, Agent, or Firm—Gabriel P. Katona

[57] ABSTRACT

A metallurgical plasma melting process wherein a plasma burner and a separate start-up burner disposed alongside same in the same port have their axes intersecting in the furnace at an acute angle. Only the start-up burner is operated initially to form a crater in material in the furnace. Thereafter the plasma burner is ignited and the start-up burner is turned off when the plasma burner is operating at full efficiency.

2 Claims, 1 Drawing Figure

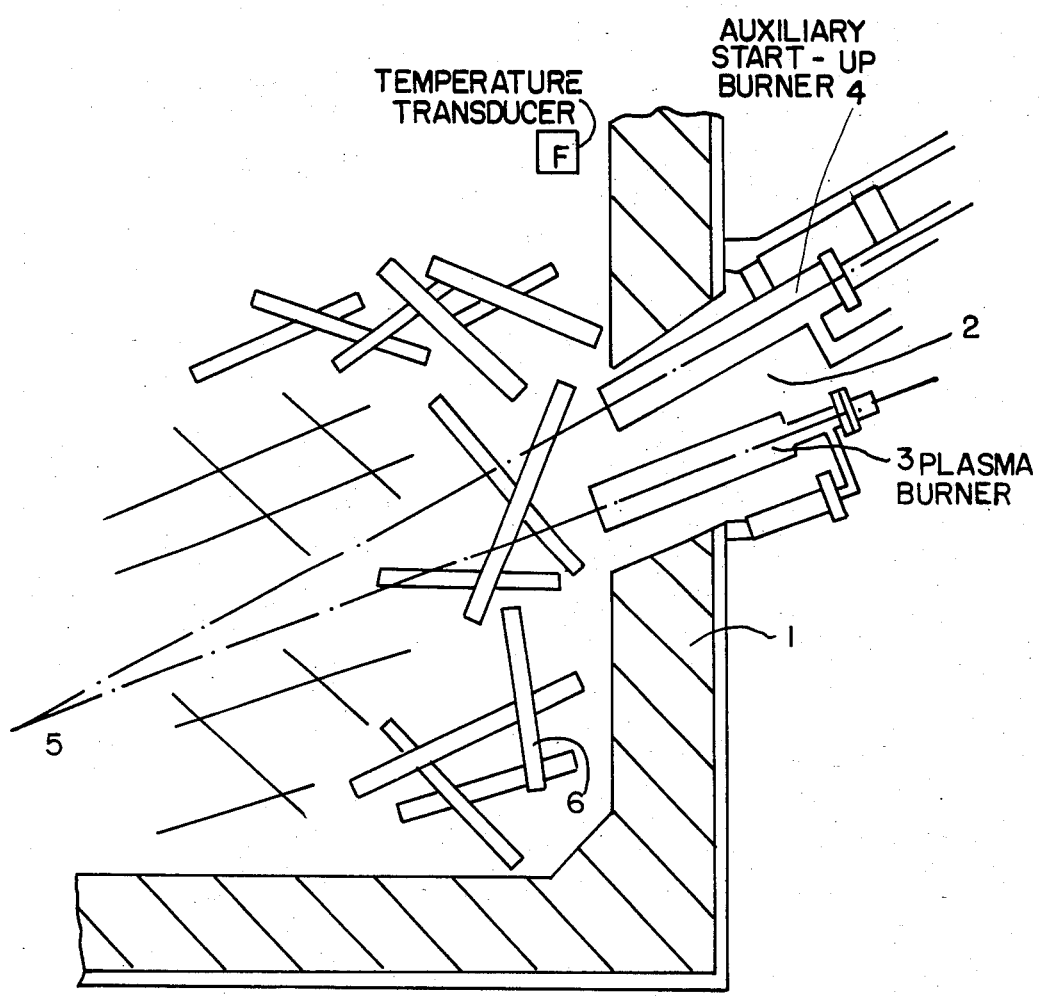

METALLURGICAL PLASMA MELTING PROCESS

This is a divisional of Ser. No. 231,606, filed on Feb. 5, 1981, now U.S. Pat. No. 4,390,773.

The present invention refers to melting and heating furnaces with DC plasma heating.

Contact electrodes provided with cooling by water or other fluids are known. They frequently have poor electric contact conditions as well as insufficient heat transfer and coolant-flow conditions, leading to a melting or destruction of the contact electrode.

In plasma melting furnaces of high current intensity the contact electrode is subjected to particularly strong thermal wear as a result of which its life is limited.

The object of the present invention is to create contact electrodes for melting and heating furnaces with DC plasma heating and high current intensities, preferably in the range of 10 to 40 kA, which have a long life, favorable heat transfer conditions and a low comsumption of material.

In accordance with the invention this object is achieved in the manner that the flow body made of a corrosion-resistant material, assures a uniform removal of heat over the entire end surface of the contact electrode, that a temperature transmitter which signals extreme thermal loads is located below the end surface of the contact electrode and that a steel head is metallically connected as wear part to the end surface of the contact electrode.

The invention will be explained in further detail with reference to the drawing. A steel head 2 which is developed as a wear part is metallically connected to the contact electrode 1. Within the bore 3 of the contact electrode 1 there is contained the flow body 4 which produces the uniform cooling of the end surface 6 of the contact electrode 1 by the special shape of its end surface 5. A temperature transmitter 7 is located below the end surface 6 to signal exceptional thermal loads.

We claim:

1. A method of melting metals and alloys in a plasma melting furnace, comprising the steps of:
   providing one plasma burner having a longitudinally extending axis and at least one separate start-up burner having a longitudinally extending axis alongside same said plasma burner in the same port in the furnace side-wall, wherein the axes of the plasma burner and start-up burner intersect in the furnace at an acute angle;
   initially operating only the start-up burner to form a crater in material in the furnace by the melting action of the start-up burner arc;
   igniting the plasma burner; and
   turning off the start-up burner when the plasma burner is operating at full capacity.

2. The method according to claim 1, further comprising sensing the temperature of gas from the furnace to determine the turn off time for the start-up burner.

* * * * *